United States Patent
McIntosh-Smith

(12) 
(10) Patent No.: US 6,324,632 B1
(45) Date of Patent: Nov. 27, 2001

(54) PROCESSING A DATA STREAM

(75) Inventor: Simon McIntosh-Smith, Bradley Stoke (GB)

(73) Assignee: STMicroelectronics Limited, Almondsbury (GB)

(*) Notice: Subject to any disclaimer, the term of this patent is extended or adjusted under 35 U.S.C. 154(b) by 0 days.

(21) Appl. No.: 09/223,827

(22) Filed: Dec. 30, 1998

(30) Foreign Application Priority Data

Dec. 30, 1997 (GB) .................................. 9727485

(51) Int. Cl.$^7$ .................................................. G06F 12/14
(52) U.S. Cl. ............................. 711/173; 74/123; 74/129
(58) Field of Search .................................. 711/123, 125, 711/126, 129, 153, 170, 173

(56) References Cited

U.S. PATENT DOCUMENTS

| | | | |
|---|---|---|---|
| 4,905,141 | * 2/1990 | Brenza | 711/129 |
| 5,434,992 | * 7/1995 | Mattson | 711/119 |
| 5,442,747 | 8/1995 | Chan et al. | 395/164 |
| 5,535,359 | 7/1996 | Hata et al. | 395/446 |
| 5,584,014 | 12/1996 | Nayfeh et al. | 395/461 |
| 5,875,465 | * 2/1999 | Kilpatrick et al. | 711/134 |
| 5,966,734 | * 10/1999 | Mohamed et al. | 711/173 |
| 6,061,763 | * 5/2000 | Rubin et al. | 711/129 |

FOREIGN PATENT DOCUMENTS

| | | |
|---|---|---|
| 2214336A | 8/1989 | (GB) . |
| 2292822A | 3/1996 | (GB) . |
| 2311880A | 10/1997 | (GB) . |

\* cited by examiner

*Primary Examiner*—Matthew Kim
*Assistant Examiner*—Christian P. Chace
(74) *Attorney, Agent, or Firm*—Robert Iannucci; Seed IP Law Group, PLLC

(57) ABSTRACT

A method and computer for processing an incoming data stream, for example of video or audio data is described. A system memory is divided into first and second memory spaces, the first memory space for holding a data stream and the second memory space for holding a set of program data. A cache has first and second partitions allocated exclusively respectively to the first and second memory spaces. In this manner, when the data stream is transferred between an execution unit and the main memory, program data is not evicted from the cache.

21 Claims, 6 Drawing Sheets

PROCESSING A DATA STREAM

TECHNICAL FIELD

The present invention relates to a method and computer system for processing a data stream, particularly but not exclusively for continuous video or audio data.

BACKGROUND OF THE INVENTION

Many algorithms involve the processing of a continuous "stream" of data, the size of the stream usually being many times that of any on-chip cache memory which may be provided. As is well known in the art, a cache memory operates between a processor and a main memory of a computer. Data and/or instructions which are required by the process running on the processor can be held in the cache while that process runs. An access to the cache is normally much quicker than an access to main memory. If the processor does not locate a required data item or instruction in the cache memory, it directly accesses main memory to retrieve it, and the requested data item or instructions is loaded into the cache. There are various known systems for using and refilling cache memories, and in particular cache memories can exhibit advantageous characteristics in respect of pre-fetching items from main memory which are expected to be required by a processor into the cache, and aggregation of writing data items out from the cache into the main memory. Despite these advantages, the usefulness of on-chip caches for processing streams of data may be limited, since the data forming an input stream is likely to be read only once, and data in the output stream is not accessed once it has been written back to main memory. A data stream can be considered to constitute a continuous sequence of bytes of data. Streams can be classified as either an input stream or an output stream. Thus, an input stream can be considered as a continuous sequence of data items which are subject to a processing step using predefined program data to generate output data. The output data may be in the form of an output data stream or may take some other output format. An output stream of data can be considered as a continuous sequence of bytes of data which have been generated by the execution of processing steps using pre-defined program data. The output stream may be generated from an input stream, or may be generated directly from the program data itself.

For the reasons outlined above, streamed data generally shows poor temporal locality of reference, and can reduce the effectiveness of existing cache memories by causing the eviction of more suitable cache occupants, in particular the program data which is used to process the data stream. That data forms an ideal cache occupant because it is repeatedly accessed for processing the data stream.

The present invention seeks to allow for processing of a data stream with enhanced performance and greater predictability.

SUMMARY OF THE INVENTION

According to one aspect of the present invention there is provided a method of processing a data stream using a set of program data in a computer system comprising an execution unit, a main memory and a cache memory divided into a plurality of cache partitions wherein the data stream is to be stored in a first memory space in the main memory and the set of program data is to be stored in a second memory space in the main memory. The method includes allocating exclusively to the first memory space a first one of the cache partitions for use by the data stream, allocating exclusively to the second memory space a second one of the cache partitions for use by the program data, and transferring the data stream between the execution unit and the main memory via the first allocated cache partition whereby in effecting this transfer the program data is not evicted from the cache memory.

The invention can be used in ways such as the following three illustrations.

In a first context, the data stream is an incoming data stream which is to be processed using the program data to generate output data. In that connection, the incoming data stream is pre-fetched into the first cache partition from the main memory prior to processing. It will readily be appreciated that as the incoming data stream is continuously pre-fetched into the first cache partition, it does not matter that the overall size of the stream may be much greater than the size of the cache partition which is available. As that cache partition is allocated exclusively to the incoming data stream, it can continuously operate to pre-fetch "chunks" of the data stream to have them ready for processing.

The output data may be generated in the form of an outgoing data stream, or in a "closed end" form. The case where the output data is in the form of an outgoing data stream constitutes a second context.

A further aspect of the present invention according to the second context provides a method of processing an incoming data stream using a set of program data to generate an outgoing data stream in a computer system comprising an execution unit, a main memory and a cache memory divided into a plurality of cache partitions wherein the incoming data stream is to be stored in a first memory space in the main memory, the set of program data is to be stored in a second memory space in the main memory and the outgoing data stream is to be stored in a third memory space in main memory. The method includes allocating exclusively to the first memory space a first one of the cache partitions for use by the incoming data stream, allocating exclusively to the second memory space a second one of the cache partitions for use by the program data, allocating exclusively to the third memory space a third one of the cache partitions for use by the outgoing data stream, prefetching data from the incoming data stream into the first cache partition; processing the data using the program data to generate the outgoing data stream and transferring the outgoing data stream to the third cache partition; and writing the outgoing data stream from the third cache partition into the third memory space.

According to a third context, the outgoing data stream may be generated from the program data itself and/or from input data in a "closed end" format, rather than from an input data stream.

The present invention also provides a computer system for processing a data stream including a main memory having a first memory space for holding a data stream and a second memory space for holding program data for use in processing said data stream, an execution unit for executing a process using said program data, a cache memory divided into a plurality of cache partitions, a cache access mechanism for controlling the storage of items in the cache memory and operable to allocate exclusively a first one of the partitions for items held in the first memory space and a second one of the partitions for items held in the second memory space; and a data transfer mechanism operable to continuously transfer the data stream between the execution unit and the main memory via the first allocated cache partition without evicting program data from the cache memory.

The invention is particularly useful for video and audio algorithms, for example MPEG 2, where the input stream represents a digitally encoded bit stream, the program data comprises look-up tables and the output stream is a decoded version of the input stream. The program data may also include an instruction sequence defining a process to be executed.

According to a concept in the present invention, cache partitioning is used to provide a mechanism by which stream processing may enjoy the performance benefits of the cache, while the contents of the rest of the cache are protected from being negatively affected by the presence of such transient stream data.

BRIEF DESCRIPTION OF THE DRAWINGS

For a better understanding of the present invention and to show how the same may be carried into effect, reference will now be made by way of example to the accompanying drawings.

DETAILED DESCRIPTION OF THE INVENTION

In the following description, there is first described a concept used in three different contexts of the invention, together with an exemplification of each context. There then follows a description of one possible implementation of how the cache may be partitioned to allow these concepts to be implemented. It will readily be appreciated however that the present invention is not necessarily restricted to the use of the cache partitioning mechanism described herein, but may be implemented with any appropriate cache partitioning mechanism.

Figure 1:
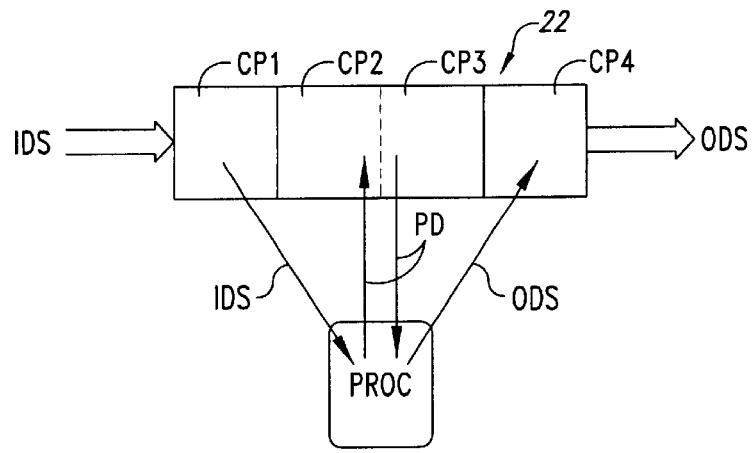
FIG. 1 is a diagram of partitioning a cache for input and output data streams.
Figure 7:
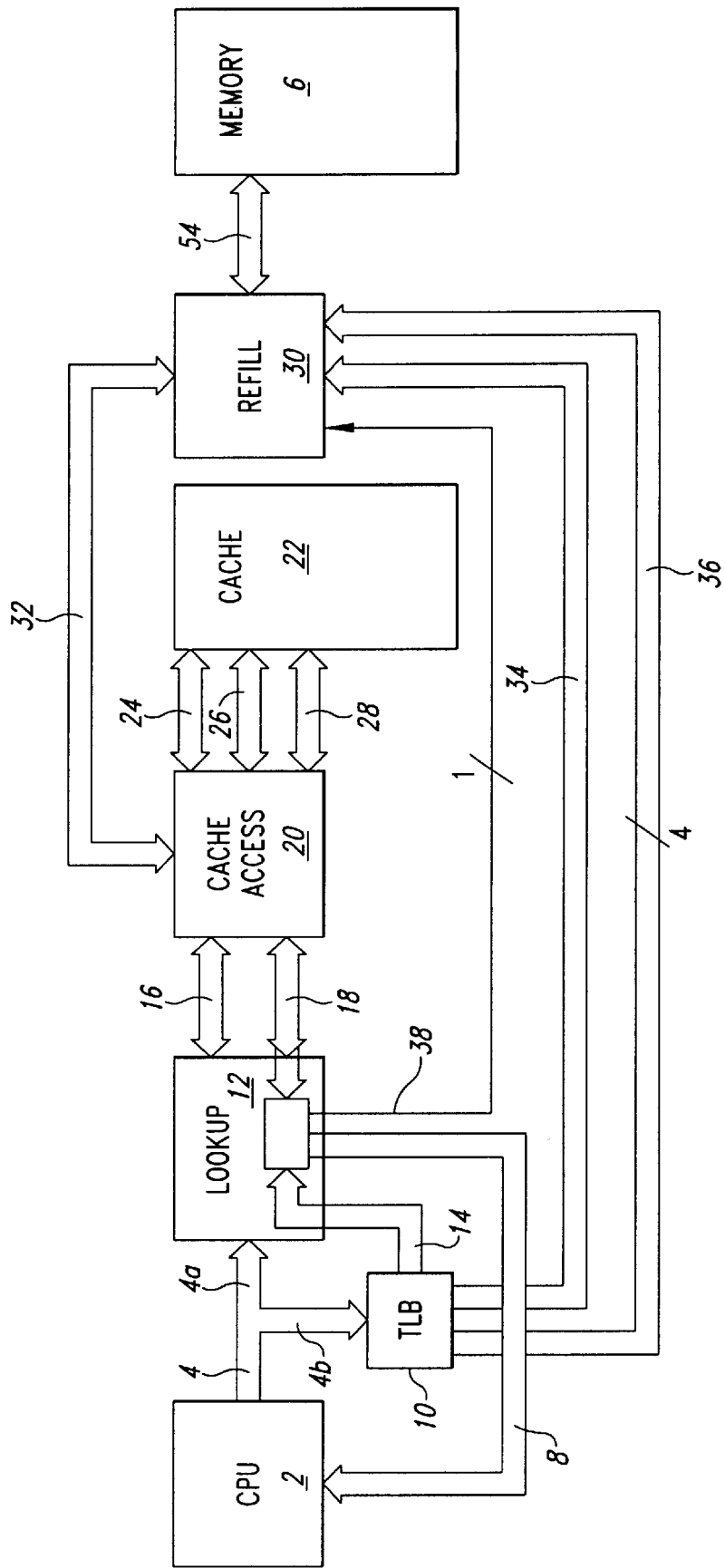
FIG. 7 is a block diagram of a computer system incorporating a cache system.

FIG. 1 illustrates diagrammatically a cache memory 22 which has four cache partitions labeled CP1 to CP4. Each of cache partitions CP1 and CP4 are laid out as direct mapped cache partitions (discussed later herein), and cache partitions CP2 and CP3 cooperate to act as a two-way set-associative cache. An input data stream IDS is continuously fetched into the first cache partition CP1 from a main memory 6 (FIG. 7) under the control of a process PROC which is being executed by a CPU 2 (FIG. 7). The process PROC accesses the input data stream IDS from the cache partition CP1 and processes it in accordance with program data which utilizes the cache partitions CP2 and CP3. This program data is denoted PD in FIG. 1 and can include for example the program stack and look-up tables required to process the input data stream IDS. An output data stream is generated as the input data stream is processed, this output data stream being held in the cache partition CP4 and written back to the main memory 6 from there. This utilization of cache partitions allows the input and output streams to both take advantage of the benefits of using the cache memory without clashing and without evicting the program data from the cache.

In FIG. 1, a situation where a single input stream and a single output stream are mapped onto respective single cache partitions is illustrated. However, it will readily be appreciated that the concept can be extended to a case of i input streams being mapped onto Pi partitions, and o output streams being mapped onto Po partitions, leaving k-Pi-Po partitions for other program data, where k is the number of cache partitions in the cache.

Figure 2:
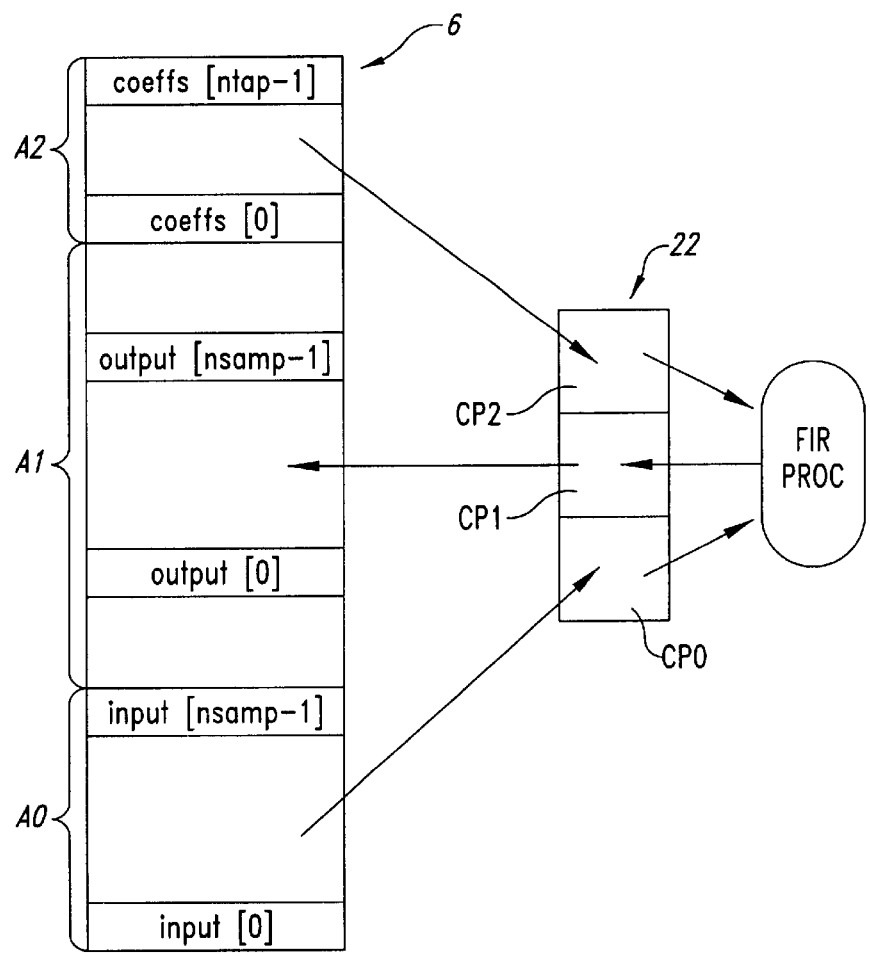
FIG. 2 is a diagram of memory and cache allocation for a finite impulse response filter.

An example is now given with reference to FIG. 2 of a process executing a finite impulse response (FIR) filter. In FIG. 2, that process is labeled FIR PROC. Table 1 indicate the lines of code used to execute the FIR process.

TABLE 1

| | |
|---|---|
| Void fir(int *input, int *output, int *coeffs, int nsamp, int ntap) | 1 |
| { | 2 |
|   int i, j; | 3 |
| | 4 |
|   createTranslation (input, nsamp*sizeof (int), PART0, WRITEBACK); | 5 |
|   createTranslation (output, nsamp*sizeof (int), PART1, WRITEBACK); | 6 |
|   createTranslation (coeffs, nsamps*sizeof (int), PART2, WRITEBACK); | 7 |
| | 8 |
|   for (i=0; i<nsamp; i++) | 9 |
|   { | 10 |
|     output[i] = 0; | 11 |
|     for (j=0; j<ntap; j++) | 12 |
|     { | 13 |
|       output[i] += input[i-j] * coeffs[j]; | 14 |
|     } | 15 |
|   } | 16 |
| } | 17 |

Description of the Algorithm in Operation

Before the filter begins, three arrays A0,A1,A2 of 4-byte, signed integers, "input", "output" and "coeffs" are allocated in main memory 6 in such a way that they, can be mapped to separate virtual pages. One way this separation can be achieved is by, choosing a single virtual page size that is large enough to contain the largest of either "input", "output" or "coeffs", and then aligning the three arrays to this size.

Once the filter begins, three entries are created in the translation look-aside buffer TLB 10 (FIG. 7), one translation for each of the three arrays. The translations are programmed so that data being brought into the cache 22 for the first time from one of the arrays can only be placed in a particular cache partition, with separate partitions CP0,CP1, CP2 being reserved for each of the arrays. When the translation is created, a virtual page size that is large enough to hold the whole array has to be chosen, which is why the array size is passed in as a parameter to the routine that creates the TLB entry.

As the filter proper begins, memory references to the three arrays occur, causing cache misses and subsequent cache line refills. In a cache without partitioning, it would be possible for cache misses that occur while referencing one of the arrays to evict data from one of the other arrays that should really remain in the cache. For example, the "coeffs"

array has all its members referenced during the filtering of a single sample. With cache partitioning, it can be guaranteed that "coeffs" is not evicted from the cache and that accesses to it will therefore always be at the predictable speed of a cache hit. Also, it is possible to prevent writes to "output" evicting data pre-fetched from "input" before it has been used.

There follows a description of how the FIR process executes with reference to the line numbers in Table 1:

Line 1: this is the function header, with the first three parameters being pointers to the arrays of 4-byte signed integers in the main memory 6. The "input" and "output" arrays are each of "nsamp" elements, while the "coeffs" array is of "ntap" elements. The arrays "input", "output" and "coeffs" will all have to occupy their own virtual page if they are to be mapped to separate cache partitions, since the granularity of cache partitioning in the implementation described herein is at the virtual page level.

Line 3: declares two integers to use as loop counters.

Line 5: creates a translation in the TLB 10 that exclusively maps the address range [input, input_nsamp*4), and sets partition bits for that translation so that data with addresses within this range can only be placed in cache partition CP0. The translation also has its cache behavior bits set to indicate that writeback mode should be used when accessing data falling within this translation.

Line 6: creates a translation in the TLB 10 that exclusively maps the address range [output, output+nsamp*4), and sets partition bits for that translation so that data with addresses within this range can only be placed in cache partition CP1. The translation also has its cache behavior bits set to indicate that writethrough mode should be used when accessing data falling within this translation.

Line 7: creates a translation in the TLB 10 that exclusively maps the address range [coeffs, coeffs+ntap*4), and sets the partition bits for that translation so that data with addresses within this range can only be placed in cache partition CP2. The translation also has its cache behavior bits set to indicate that writeback mode should be used when accessing data falling within this translation.

Line 9: a loop across all the input samples that need filtering.

Line 11: initialize the next output value to 0.

Line 12: a loop across all the taps that need to be applied in creating the next sample.

Line 14: the actual filter, an embodiment of the following equation:

$$output(i) = \sum_{j=0}^{ntap-1} input(i-j) \times coeffs(j)$$

where "input" is the array of input samples to be filtered, "ntap" is the number of taps in the filter, and "coeffs" are the filter coefficients taps.

Figure 3:
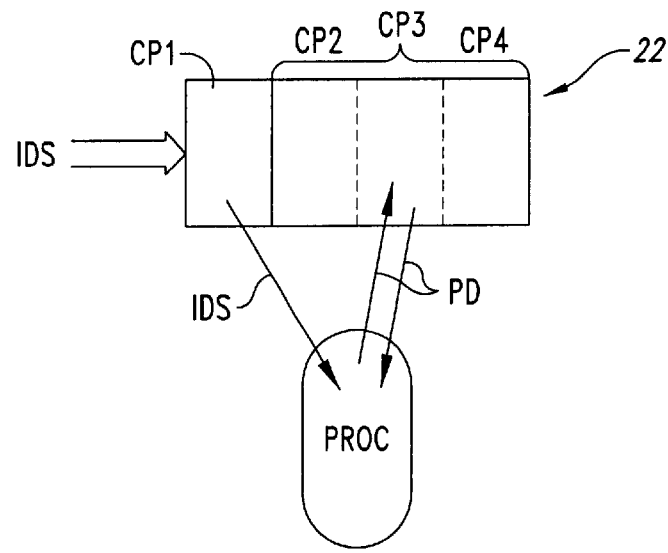
FIG. 3 is a diagram of partitioning a cache for an input data stream.

In the arrangement of FIG. 3, the principles outlined above are used only for an input data stream IDS. In that case, the cache partition CP1 is direct mapped, while the cache partitions CP2 to CP4 cooperate to form a three-way set-associative cache for holding the program data for the executing process PROC. The input data stream IDS can be fetched using the cache refill mechanism 30 (FIG. 7) and enjoy the benefits that are provided by this mechanism while avoiding the problem of those input streams polluting the cache by evicting important program data PD.

Figure 4:
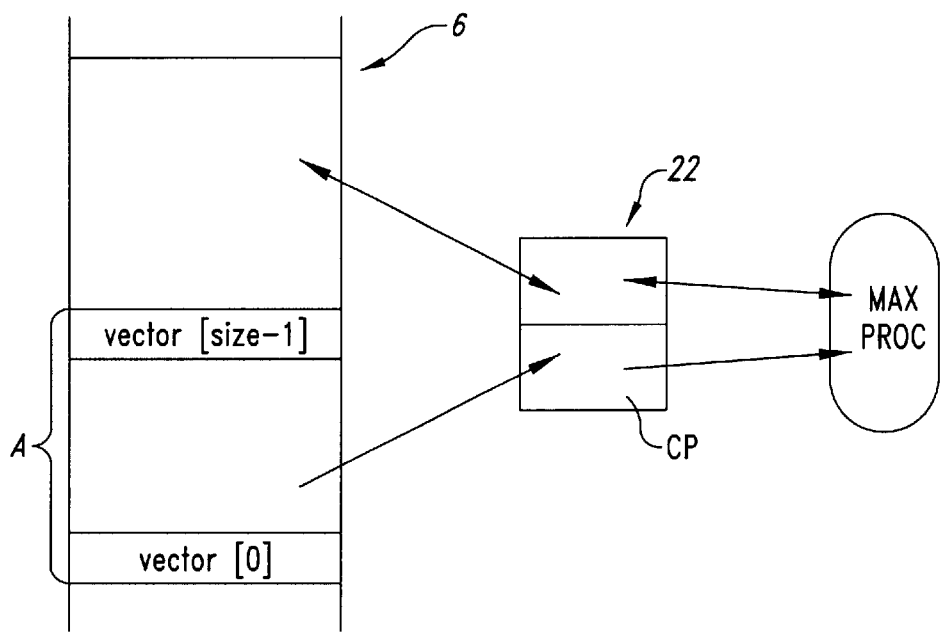
FIG. 4 is a diagram of memory and cache allocation for vector max/min algorithms.

An example is now given with reference to FIG. 4 of executing a vector maximum algorithm using the lines of code illustrated in Table 2.

Description of the Algorithm in Operation

Before the maximum function MAX begins, an array A of 4-byte, signed integers, "vector" is allocated in main memory 6 in such a way that it can be mapped to its own, separate virtual page. One way this separation can be achieved is by choosing a single virtual page size that is large enough to contain "vector", and then aligning the start of the array to this size.

Once the maximum function MAX begins, the first thing it does is to create a single TLB entry to provide a translation for the "vector" array. The translation is programmed so that data being brought into the cache for the first time from the array can only be placed in a particular cache partition CP. When the translation is created, a virtual page size that is large enough to hold the whole array has to be chosen, which is why the array size is passed in as a parameter to the routine that creates the TLB entry.

As the maximum function proper begins, memory references to the "vector" array occur, causing cache misses and subsequent cache line refills. In an implementation with a unified cache, a large "vector" array could easily start to evict the code for the "vectormax" function itself from the cache, and "swamp" the cache. Cache partitioning avoids these problems of stream data evicting closed end program data from the cache.

TABLE 2

| | |
|---|---|
| Int vectormax (int *vector, int vectorsize) | 1 |
| { | 2 |
|   int i, max; | 3 |
| | 4 |
|   createTranslation (vector, vectorsize*sizeof (int), PART0, WRITEBACK); | 5 |
| | 6 |
|   max = vector[0]; | 7 |
| | 8 |
|   for (i=1; i<vectorsize; i++) | 9 |
|   { | 10 |
|     if (vector[i] > max) | 11 |
|       max = vector [i]; | 12 |
|   } | 13 |
| | 14 |
|   return max; | 15 |
| } | 16 |

There follows a description of how the MAX process executes with reference to the line numbers in Table 2:

Line 1: this is the function header, with the first parameter being a pointer to the array of 4-byte signed integers in the main memory 6. The "vector" array is of "vectorsize" elements. The "vector" array will have to occupy its own virtual page if it is to be mapped to its own, separate cache partition, since the granularity of cache partitioning in the implementation described herein is at the virtual page level.

Line 3: declares two integers, one to use as a loop counter, the other to record the largest integer found so far during a scan along the "vector" array.

Line 5: creates a translation in the TLB 10 that exclusively maps the address range [vector, vector+vectorsize*4), and sets the partition bits for that translation so that data with addresses within this range can only be placed in cache; partition CP0. The translation also has its cache behavior bits set to indicate that writeback mode should be used when accessing data falling within this translation.

Line 7: initializes the maximum integer found so far to be the first element of the vector being examined.

Line 9: a loop across all but the first of vector's elements.

Line 11: tests for the i'th element of the vector being larger than the largest integer seen so far.

Line 12: if the i'th element is the largest seen so far, remember it.

Line 15: return the largest element found in "vector".

Figure 5:
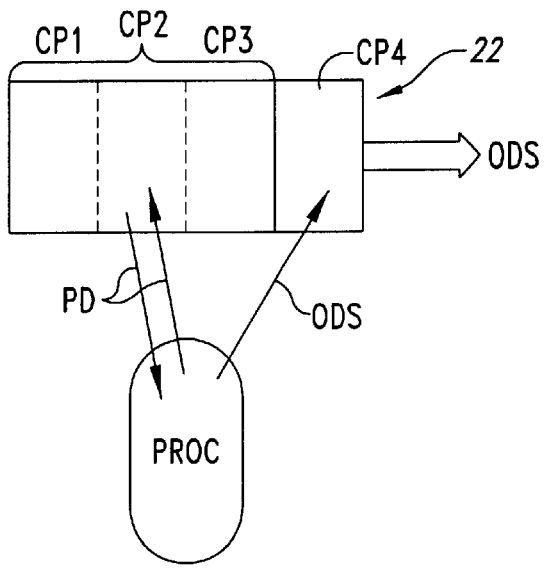
FIG. 5 is a diagram of partitioning a cache for an output data stream.

FIG. 5 illustrates the concept of the invention when used for output streams only. In FIG. 5, cache partitions CP1 to CP3 cooperate to form a three-way set-associative cache, and cache partition CP4 is direct mapped. The process PROC being executed on the CPU 2 generates an output data stream ODS which uses the cache partition CP4. This allows for the output stream to be written to fast cache memory and for the propagation of those writes to external memory to be managed by the cache refill mechanism hence enjoying the benefits provided by this mechanism while avoiding the problem of evicting important program data.

Figure 6:
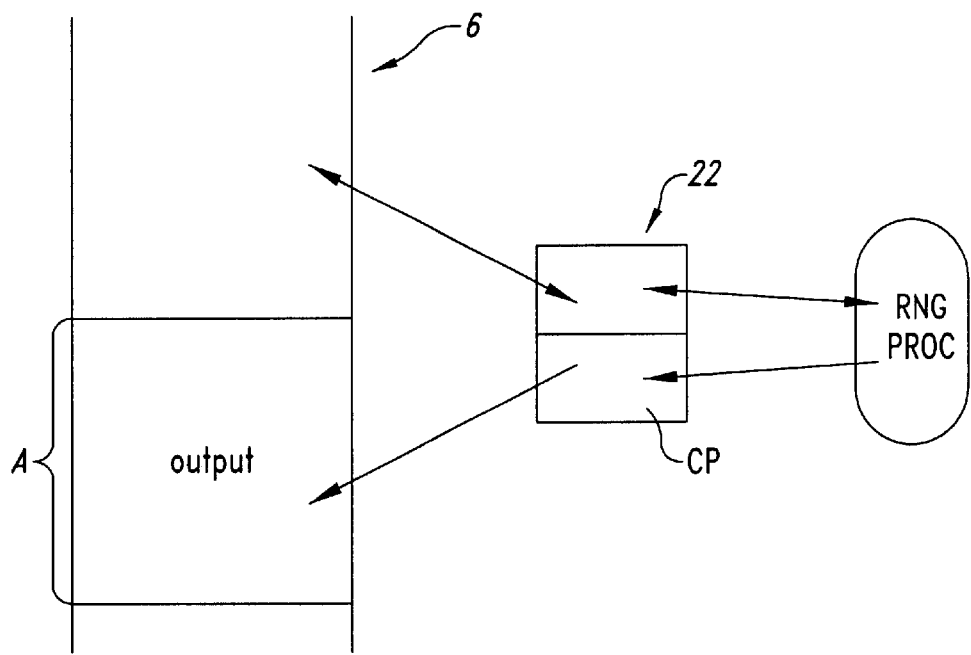
FIG. 6 is a diagram of memory and cache allocation for a random number generator algorithm.

An example used will now be described with reference to FIG. 6 for a process executing a random number generator. Table 3 lists the code for this example.

Description of the Algorithm in Operation

Before the pseudo-random number generator begins, the empty array A of 4-byte, signed integers, "output", is allocated in main memory in such a way that it can be mapped to its own, separate virtual page. One way this separation can be achieved is by choosing a single virtual page size that is large enough to contain "output", and then aligning the array to this size.

Once the random number generator begins, the first thing it does is to create a single TLB entry to provide a translation for the "output" array. The translation is programmed so that data being written in to the cache for the first time for the array can only be placed in a particular cache partition CP. When the translation is created, a virtual page size that is large enough to hold the whole array has to be chosen, which is why the array size is passed in as a parameter to the routine that creates the TLB entry.

As the random number generator proper begins, memory references to the "output" array occur, causing cache misses and subsequent cache line refills. In a cache without partitioning, a large "output" array could easily start to evict the code for the "pseudorandom" function itself from the cache. Cache partitioning avoids these problems of stream data evicting closed end program data from the cache.

TABLE 3

| Void pseudorandom (int see, int nsamp, int *output) | 1 |
|---|---|
| { | 2 |
|   int i; | 3 |
|   long long temp; | 4 |
|  | 5 |
|   createTranslation (output, nsamp*sizeof(int), PART0, WRITEBACK); | 6 |
|  | 7 |
|   temp = (long long) seed; | 8 |
|  | 9 |
|   for (i=0; i<nsamp; i++) | 10 |
|   { | 11 |
|     temp = 16807*temp % 2147483647; | 12 |
|     output[i] = (int)temp; | 13 |
|   } | 14 |
| } | 15 |

There follows a description of how the RNG process executes with reference to the line numbers:

Line 1: this is the function header, with the first parameter being a seed value for the random number generator, the second parameter being the number of pseudo-random numbers to generate, and the third parameter being a pointer to an area in main memory into which the results are to be written. The "output" array will be of "tnsamp" elements, and will have to occupy its own virtual page if it is to be mapped to its own, separate cache partition, since the granularity of cache partitioning in the proposed implementation is at the virtual page level.

Line 3: declares an integer to use as a loop counter.

Line 4: declares a 64-bit signed integer to use as a temporary value.

Line 6: creates a translation in the TLB that exclusively maps the address range [output, output+nsamp*4), and sets the partition bits for that translation so that data with addresses within this range can only be placed in cache partition CP0. The translation also has its cache behavior bits set to indicate that writeback mode should be used when accessing data falling within this translation.

Line 8: initializes the temporary value to be the input seed value.

Line 10: a loop across all the pseudo-random numbers to be generated.

Line 12: a recurrence relation of the form:

$$1_{j+1} = a l_j \bmod m$$

using values of "a" as ($7^5$) and "m" as ($2^{31}-1$) has stood the test of time as being as good as most pseudo-random number generators.

Line 13: write the bottom 32-bits of the result to the i'th element of the output array.

One implementation of a cache partitioning system which can be used to implement the present invention will now be described with reference to FIGS. 7 to 10.

FIG. 7 is a block diagram of a computer incorporating a cache system. The computer comprises the CPU 2 which is connected to an address bus 4 for accessing items from the main memory 6 and to a data bus 8 for returning items to the CPU 2. Although the data bus 8 is referred to herein as a data bus, it will be appreciated that this is for the return of items from the main memory 6, whether or not they constitute actual data ("streamed" data or LUTs for example), or instructions (e.g., the program stack) for execution by the CPU. In the computer described herein, the addressing scheme is a so-called virtual addressing scheme. The address is split into a line in page address 4a and a virtual page address 4b. The virtual page address 4b is supplied to the translation look-aside buffer (TLB) 10. The line in page address 4a is supplied to a look-up circuit 12. The translation look-aside buffer 10 supplies a real page address 14 converted from the virtual page address 4b to the look-up circuit 12. The look-up circuit 12 is connected via address and data buses 16,18 to a cache access circuit 20. Again, the data bus 18 can be for data items or instructions from the main memory 6. The cache access circuit 20 is connected to the cache memory 22 via an address bus 24, a data bus 26 and a control bus 28 which transfers replacement information for the cache memory 22. The refill engine 30 is connected to the cache access circuit 20 via a refill bus 32 which transfers replacement information, data items (or instructions) and addresses between the refill engine and the cache access circuit. The refill engine 30 is itself connected to the main memory 6.

The refill engine 30 receives from the translation look-aside buffer 10 a full real address 34, comprising the real page address and line in page address of an item in the main memory 6. The refill engine 30 also receives a partition indicator comprising the partition bits referred to above from the translation look-aside buffer 10 on a four bit bus 36.

Finally, the refill engine 30 receives a miss signal on line 38 which is generated in the look-up circuit 12 in a manner which will be described more clearly hereinafter.

Operation of the computer system illustrated in FIG. 1 will now be described. The CPU 2 requests an item from main memory 6 using the address in main memory and transmits that address on address bus 4. The virtual page number is supplied to the translation look-aside buffer 10 which translates it into a real page number 14 according to a predetermined virtual to real page translation algorithm. The real page number 14 is supplied to the look-up circuit 12 together with the line in page number 4a of the original address transmitted by the CPU 2. The line in page address is used by the cache access circuit 20 to address the cache memory 22. The line in page address includes a set of least significant bits (not necessarily including the end bits) of the main address in memory which are equivalent to the row address in the cache memory 22. The contents of the cache memory 22 at the row address identified by the line in page address, being a data item (or instruction) and the address in main memory of the data item (or instruction), are supplied to the look-up circuit 12. There, the real page number of the address which has been retrieved from the cache memory is compared with the real page number which has been supplied from the translation look-aside buffer 10. If these addresses match, the look-up circuit indicates a hit which causes the data item which was held at that row of the cache memory to be returned to the CPU along data bus 8. If however the real page number of the address which was held at the addressed row in the cache memory 22 does not match the real page number supplied from the translation look-aside buffer 10, then a miss signal is generated on line 38 to the refill engine 30. It is the task of the refill engine 30 to retrieve the correct item from the main memory 6, using the real address which is supplied from the translation look-aside buffer 10 on bus 34. The data item, once fetched from main memory 6 is supplied to the cache access circuit 20 via the refill bus 32 and is loaded into the cache memory 22 together with the address in main memory. The data item itself is also returned to the CPU along data bus 8 so that the CPU can continue to execute.

Figure 8:
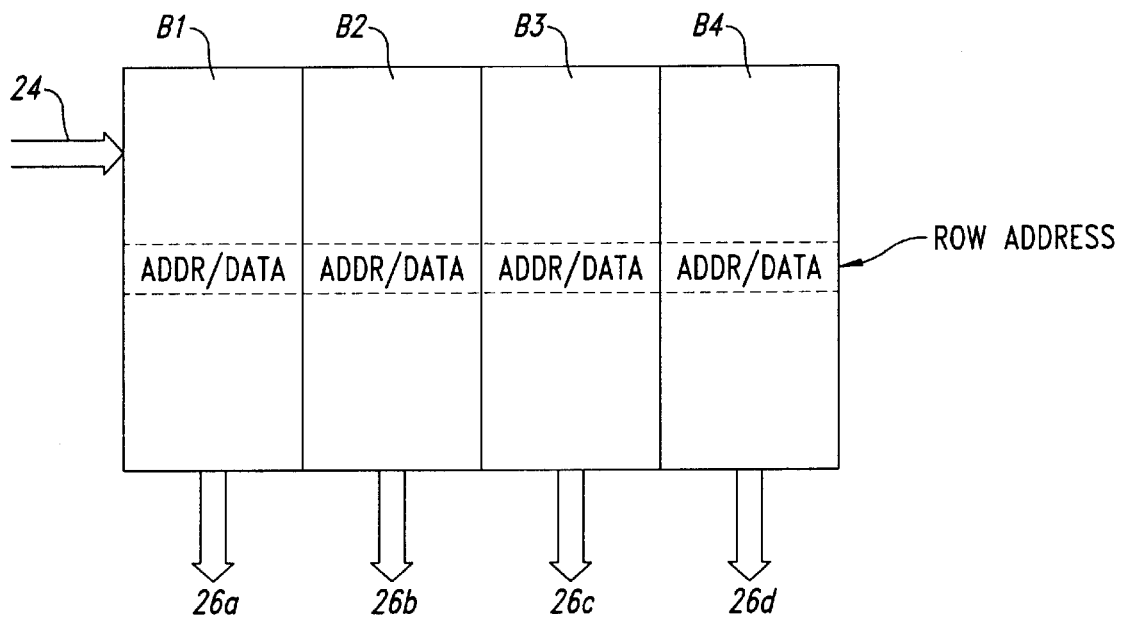
FIG. 8 is a sketch illustrating a four-way set-associative cache.

As illustrated in FIG. 8, the cache memory 22 is divided into four banks B1,B2,B3,B4. The banks can be commonly addressed row-wise by a common row address, as illustrated schematically for one row in FIG. 8. However, that row contains four cache entries, one for each bank. The cache entry for bank B1 is output on bus 26a, the cache entry for bank B2 is output on bus 26b, and so on for banks B3 and B4. Thus, this allows four cache entries for one row address (or line in page address). Each time a row is addressed, four cache entries are output and the real page numbers of their addresses are compared with the real page number supplied from the translation look-aside buffer 10 to determine which entry is the correct one. If there is a cache miss upon an attempted access to the cache, the refill engine 30 retrieves the requested item from the main memory 6 and loads it into the correct row in one of the banks, in accordance with a refill algorithm which is based on, for example, how long a particular item has been held in the cache, or other program parameters of the system. Such replacement algorithms are known and are not described further herein.

Figure 9:
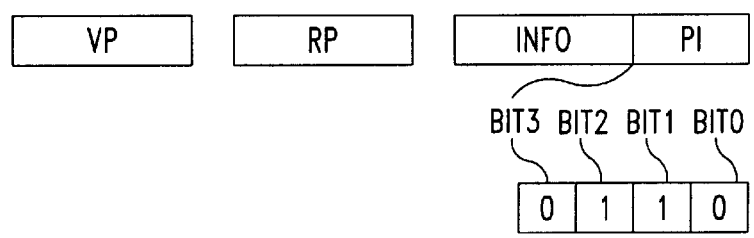
FIG. 9 is an example of an entry in a translation look-aside buffer.

To implement cache partitioning, in the translation look-aside buffer 10 each TLB entry has associated with the virtual page number, a real page number and an information sequence. An example entry is shown in FIG. 9, where VP represents the virtual page number, RP represents the real page number and INFO represents the information sequence. The information sequence contains various information about the address in memory, including cache behavior bits, which are already known. In addition, in the presently described system the information sequence additionally contains the partition indicator PI, which in the described embodiment is four bits long. Thus, bits 0 to 3 of the information sequence INFO constitute the partition indicator. The partition indicator gives information regarding the partition into which the data item may be placed when it is first loaded into the cache memory 22. For the cache structure illustrated in FIG. 8, each partition can constitute one bank of the cache. In the partition indicator, each bit refers to one of the banks. The value of 1 in bit j of the partition indicator means that the data in that page may not be placed in partition j. The value of 0 in bit j means that the data in that page may be placed in partition j. Data may be placed in more than one partition by having a 0 in more than one bit of the partition indicator. A partition indicator which is all zeros allows the data to be placed in any partition of the cache. A partition indicator which is all ones does not allow any data items to be loaded into the cache memory. This could be used for example for "freezing" the contents of the cache, for example for diagnostic purposes.

In the example given in FIG. 9, the partition indicator indicates that replacement of data items that have that real page number in main memory may not use banks B1 or B4 but may use banks B2 or B3. When one bank is allocated to a page in memory, that bank acts as a directed mapped cache partition. That is, it has a plurality of addressable storage locations, each location constituting one row of the cache. Each row contains an item from main memory and the address in main memory of that item. Each row is addressable by a row address which is constituted by a number of bits representing the least significant bits of the address in main memory of the data items stored at that row. For example, for a cache memory having eight rows, each row address would be three bits long to uniquely identify those rows. For example, the second row in the cache has a row address 001 and thus could hold any data items from main memory having an address in the main memory which ends in the bits 001.

It is possible to allocate more than one bank to a page. In that case, if the line in page address has more bits than the row address for the cache, the partitions would behave as a k-way set associative cache, where k partitions are allocated to a page. Thus, in the described example banks B2 and B3 form a two-way set-associative cache as illustrated in the example of FIG. 1.

The partition information is not used on cache look-up, but only upon cache replacement or refill. Thus, the cache access can locate data items held anywhere in the cache memory, whereas a replacement will only replace data into the allowed partitions for that page address.

Figure 10:
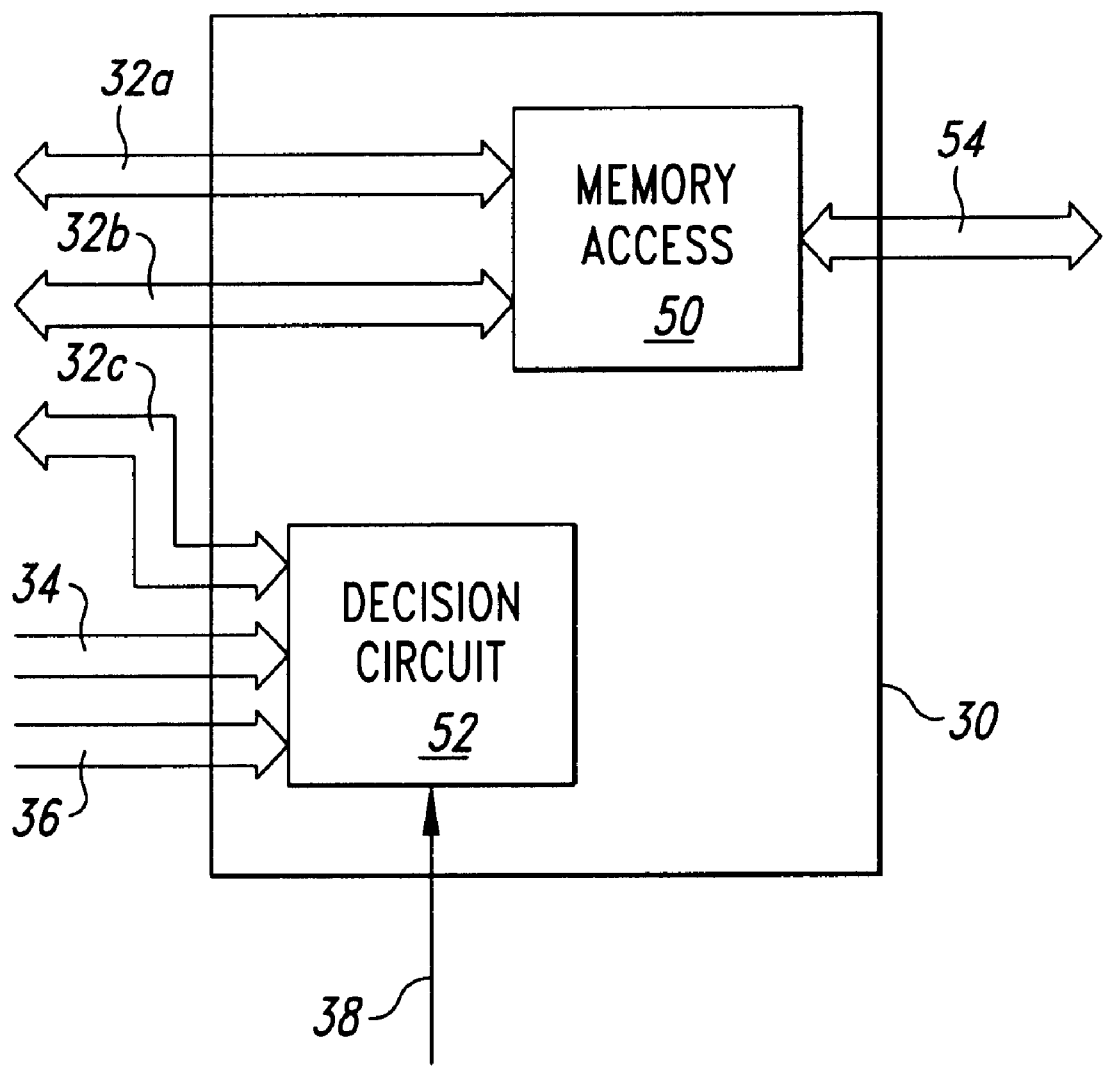
FIG. 10 is a block diagram of a refill engine.

FIG. 10 illustrates in more detail the content of the refill engine 30. The refill bus 32 is shown in FIG. 10 as three separate buses, a data bus 32a, an address bus 32b and a bus 32c carrying replacement information. The address and data buses 32a and 32c are supplied to a memory access circuit 50 which accesses the main memory via the memory bus 54. The replacement information is fed to a decision circuit 52 which also receives the real address 34, the partition indicator PI on bus 36 and the miss signal 38. The decision circuit 52 determines the proper partition of the cache into which data accessed the main memory is to be located.

The partition indicator PI can be set in the TLB like any other TLB entry. In the described example, the partition indicators are set by the process being executed on the CPU 2.

In the embodiment described above, a single cache access circuit 20 is shown for accessing the cache both on look-up and refill. However, it is also possible to provide the cache with an additional access port for refill, so that look-up and refill take place via different access ports for the cache memory 22.

In the described embodiment, the refill engine 30 and cache access circuit. 20 are shown in individual blocks. However, it would be quite possible to combine their functions into a single cache access circuit which performs both look-up and refill.

What is claimed is:

1. A method of processing a data stream using a set of program data in a computer system comprising an execution unit, a main memory and a cache memory divided into a plurality of cache partitions wherein the data stream is to be stored in a first memory space in the main memory and the set of program data is to be stored in a second memory space in the main memory, the method comprising:

allocating exclusively to the first memory space a first one of the cache partitions for use by the data stream;

allocating exclusively to the second memory space a second one of the cache partitions for use by the program data; and transferring the data stream between the execution unit and the main memory via the first allocated cache partition whereby in effecting this transfer the program data is not evicted from the cache memory.

2. The method according to claim 1, wherein the data stream comprises video or audio data.

3. The method according to claim 1, wherein the data stream is an incoming data stream which is to be processed using said program data to generate an outgoing data stream, said incoming data stream being prefetched into the first cache partition from the main memory prior to processing.

4. The method according to claim 1, wherein the data stream is an outgoing data stream generated from said program data and which is output from the execution unit to the first cache partition and then written from the first cache partition to the main memory.

5. The method according to claim 1, wherein the program data comprises a look-up table.

6. The method according to claim 1, wherein the program data comprises an instruction sequence defining a process to be executed.

7. A method of processing an incoming data stream using a set of program data to generate an outgoing data stream in a computer system comprising an execution unit, a main memory and a cache memory divided into a plurality of cache partitions wherein the incoming data stream is to be stored in a first memory space in the main memory, the set of program data is to be stored in a second memory space in the main memory and the outgoing data stream is to be stored in a third memory space in main memory, the method comprising:

allocating exclusively to the first memory space a first one of the cache partitions for use by the incoming data stream;

allocating exclusively to the second memory space a second one of the cache partitions for use by the program data;

allocating exclusively to the third memory space a third one of the cache partitions for use by the outgoing data stream;

prefetching data from the incoming data stream into the first cache partition;

processing said data using the program data to generate said outgoing data stream and transferring the outgoing data stream to the third cache partition; and writing the outgoing data stream from the third cache partition into the third memory space.

8. The method according to claim 7, wherein the data stream comprises video or audio data.

9. The method according to claim 7, wherein the program data comprises a look-up table.

10. The method according to claim 7, wherein the program data comprises an instruction sequence defining a process to be executed.

11. A computer system for processing a data stream comprising:

a main memory having a first memory space for holding a data stream and a second memory space for holding program data for use in processing said data stream;

an execution unit for executing a process using said program data;

a cache memory divided into a plurality of cache partitions;

a cache access mechanism for controlling the storage of items in the cache memory and allocating exclusively a first one of said partitions for items held in the first memory space and a second one of said partitions for items held in the second memory space; and a data transfer mechanism that continuously transfers the data stream between the execution unit and the main memory via the first allocated cache partition without evicting program data from the cache memory.

12. In a computer system including a processor, a main memory divided into a plurality of sections and a cache memory divided into a plurality of cache partitions, the computer system storing a data stream in a first section of the main memory and storing a set of program data in a second section of the main memory, a method of processing a data stream using the set of program data, the method comprising the steps of:

associating a first cache partition to the first section of main memory;

associating a second cache partition to the second section of main memory;

transferring the data stream between the first section of memory, the first cache partition, and the processor;

preventing data in the first cache partition from being replaced by data from the second section of memory; and preventing data in the second cache partition from being replaced by data from the first section of memory.

13. The method according to claim 12, wherein the data stream comprises video or audio data.

14. The method according to claim 12, wherein the data stream is an incoming data stream which is to be processed using the program data to generate an outgoing data stream, the incoming data stream being pre-fetched into the first cache partition from the main memory prior to processing.

15. The method according to claim 12, wherein the data stream is an outgoing data stream generated from the program data and which is output from the processor to the first cache partition and then written from the first cache partition to the main memory.

16. The method according to claim 12, wherein the program data comprises a look-up table.

17. The method according to claim 12, wherein the program data comprises an instruction sequence defining a process to be executed.

18. In a computer system including a processor, a main memory divided into a plurality of sections and a cache memory divided into a plurality of cache partitions, the computer system storing an incoming data stream in a first section of the main memory, storing a set of program data in a second section of the main memory, and storing an outgoing data stream in a third section of main memory, a method of processing a data stream using the set of program data, the method comprising the steps of:

associating a first cache partition to the first section of main memory;

associating a second cache partition to the second section of main memory;

associating a third cache partition to the third section of main memory;

pre-fetching data from the incoming data stream to the first cache partition;

processing data retrieved from the first cache partition into the outgoing data stream;

storing the outgoing data stream into the third cache partition;

transferring the data from the third cache partition to the third section of memory;

preventing data in the first cache partition from being replaced by data from the second or third sections of memory;

preventing data in the second cache partition from being replaced by data from the first or third sections of memory; and preventing data in the third cache partition from being replaced by data from the first or second sections of memory.

19. The method according to claim 18, wherein the incoming data stream comprises video or audio data.

20. The method according to claim 18, wherein the program data comprises a look-up table.

21. The method according to claim 18, wherein the program data comprises an instruction sequence defining a process to be executed.

* * * * *